Figure 1:
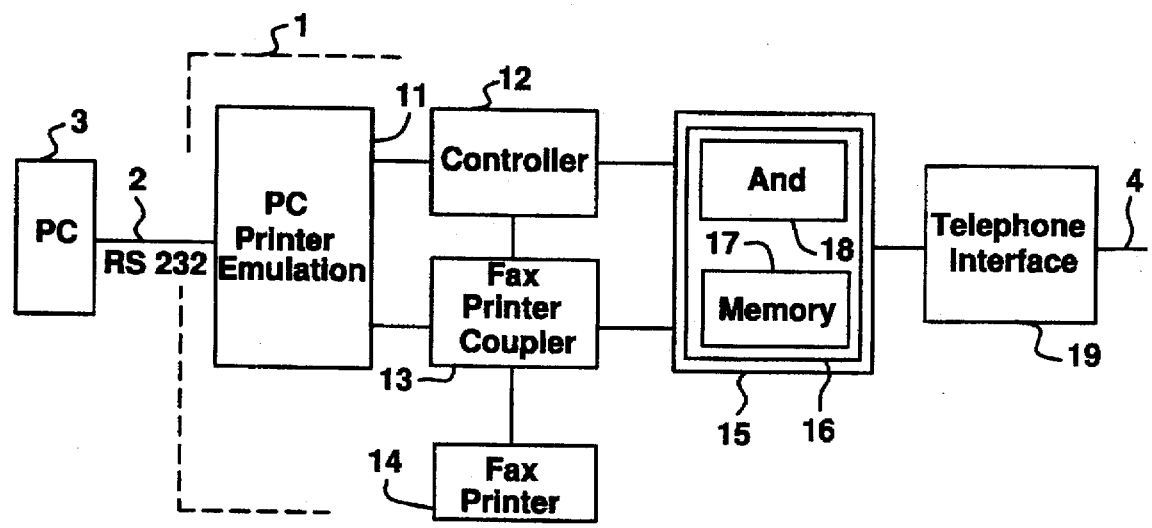

United States Patent [19]
Picard

[11] Patent Number: 5,680,227
[45] Date of Patent: Oct. 21, 1997

[54] METHOD AND DEVICE FOR EMULATING A PRINTER FOR A PERSONAL COMPUTER USING A FACIMILE-MACHINE PRINTER

[75] Inventor: Francois Picard, Conflans, France

[73] Assignee: Societe d'Applications Generales d'Electricite et de Mecanique SAGEM, France

[21] Appl. No.: 305,089

[22] Filed: Sep. 13, 1994

[30] Foreign Application Priority Data

Sep. 14, 1993 [FR] France ................... 93 10912

[51] Int. Cl.$^6$ .................................................. H04N 1/32
[52] U.S. Cl. ............................................................ 358/468
[58] Field of Search ........................ 358/296, 358; 320/306; 388/442; 378/100; 395/101, 114

[56] References Cited

U.S. PATENT DOCUMENTS

| | | |
|---|---|---|
| 4,991,200 | 2/1991 | Lin . |
| 5,023,867 | 6/1991 | Badaoui et al. ............... 370/56 |
| 5,383,030 | 1/1995 | Seo ................................ 358/442 |

FOREIGN PATENT DOCUMENTS 0519253  6/1992  European Pat. Off. .

OTHER PUBLICATIONS

IBM Technical Disclosure Bulletin, vol. 30, No. 7, Dec. 1987, pp. 307–310.

Patent Abstracts of Japan, vol. 13, No. 439 (E–827) Oct. 1989 & JPA–01 168 158 (NEC Corp.) Jul. 3, 1989 abstract.

Primary Examiner—Benjamin R. Fuller
Assistant Examiner—Craig A. Hallacher
Attorney, Agent, or Firm—Graham & James LLP

[57] ABSTRACT

A device for emulating a personal computer printer with a facsimile-machine printer (14) including a buffer memory (21) which receives data from the personal computer (3), circuits (22, 24) coupled to both a command buffer circuit (23) and a calculation block (25). The circuits (22, 24), command buffer circuit (23) and the calculation block (25) control the facsimile-machine printer (14) in response to the data, determine the availability the facsimile-machine printer (14) by effecting cyclic scanning of the facsimile-machine and control the printing of the facsimile-machine (14) printer in response to the data when the facsimile-machine printer (14) is determined to be available for printing.

5 Claims, 2 Drawing Sheets

METHOD AND DEVICE FOR EMULATING A PRINTER FOR A PERSONAL COMPUTER USING A FACIMILE-MACHINE PRINTER

BACKGROUND OF THE INVENTION

Field of the Invention

The present invention is related to printer equipment. More particularly, the present invention is related to printer equipment for use with personal computers.

Discussion of Related Art

Numerous types of electronic apparatus used in offices include a printer, or are associated with a printer, in order to publish and exploit the data received and/or processed by such apparatus. For instance, facsimile machines and personal computers come to mind.

In the case of facsimile machines, the printer, which is integrated in the facsimile machine, is controlled in relatively simple manner since it prints lines of dots separated by white spaces of variable length.

In the case of personal computers, the printer is external to the computer and has sophisticated software in order to interpret an extended set of character printing commands, either in line mode or in graphic mode. Such a computer printer is expensive and bulky.

EP-A-519 253 teaches assigning the printer of a facsimile machine also to a personal computer by providing, within the facsimile machine, a circuit which emulates a computer printer and switches the operation of the facsimile machine from facsimile printing mode to character printing mode when the computer sends data to the facsimile machine over a special line.

However, the printing provided in said document under computer control causes the temporary unavailability of the other functions of the facsimile machine, which is difficult to accept if the computer orders printing frequently. Furthermore, and even if the facsimile machine is in an operation that does not require the use of the printer, the computer cannot have access to the available printer, which forces the user of the computer to repeat the request for printing.

The present invention is directed to overcoming these difficulties.

SUMMARY OF THE INVENTION

The present invention provides a method and a device for emulating a personal computer printer using a facsimile-machine printer. The device comprises means for receiving data coming from the computer and means for controlling the printer as a function of this data which is adapted to scan the printer and determine its availability. In particular, the control means is adapted to effect a cyclical scan of the printer and to control its printing of the data from the computer when the printer is available.

Thus, even when printing from the computer, the facsimile machine retains its "facsimile" function and can exchange messages with another facsimile machine, since the emulation circuit frees the facsimile machine from carrying out the printing job ordered by the computer. Furthermore, an existing exchange of facsimile messages leaves the printer available to the computer.

The invention also concerns a process for emulating a personal computer printer using a facsimile-machine printer in which the computer is connected to printing emulation apparatus of the facsimile machine which is activated by the reception of data from the computer, which process is characterized by the fact that, after activation of the emulation device and the generating of a printing request, the emulation device scans the printer and determines it availability and, in case of unavailability, the printing request is stored so as to bring about a cyclic scanning of the printer in order to start the printing of the computer data when the printer becomes available.

Figure 2:
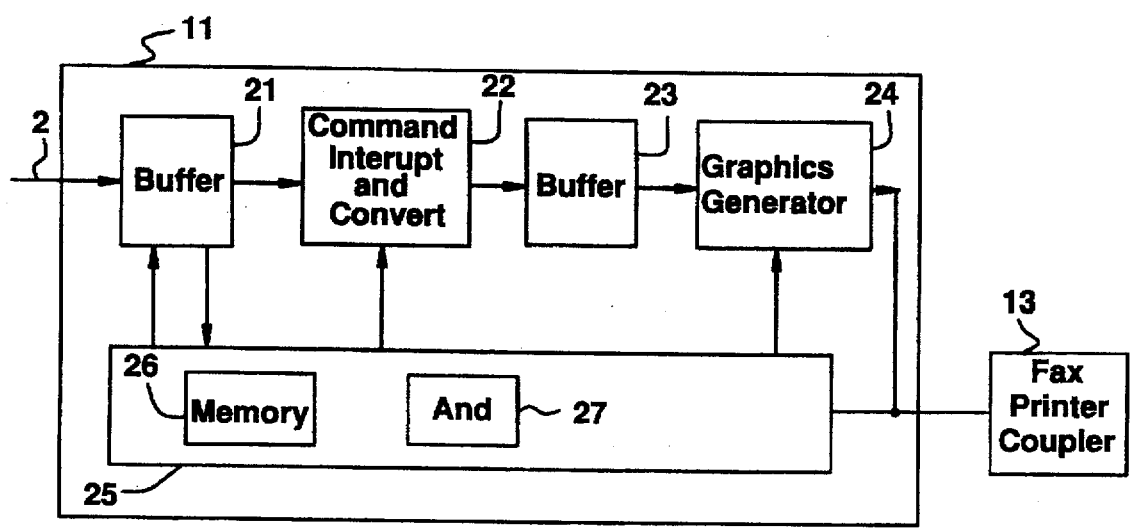
Figure 3:
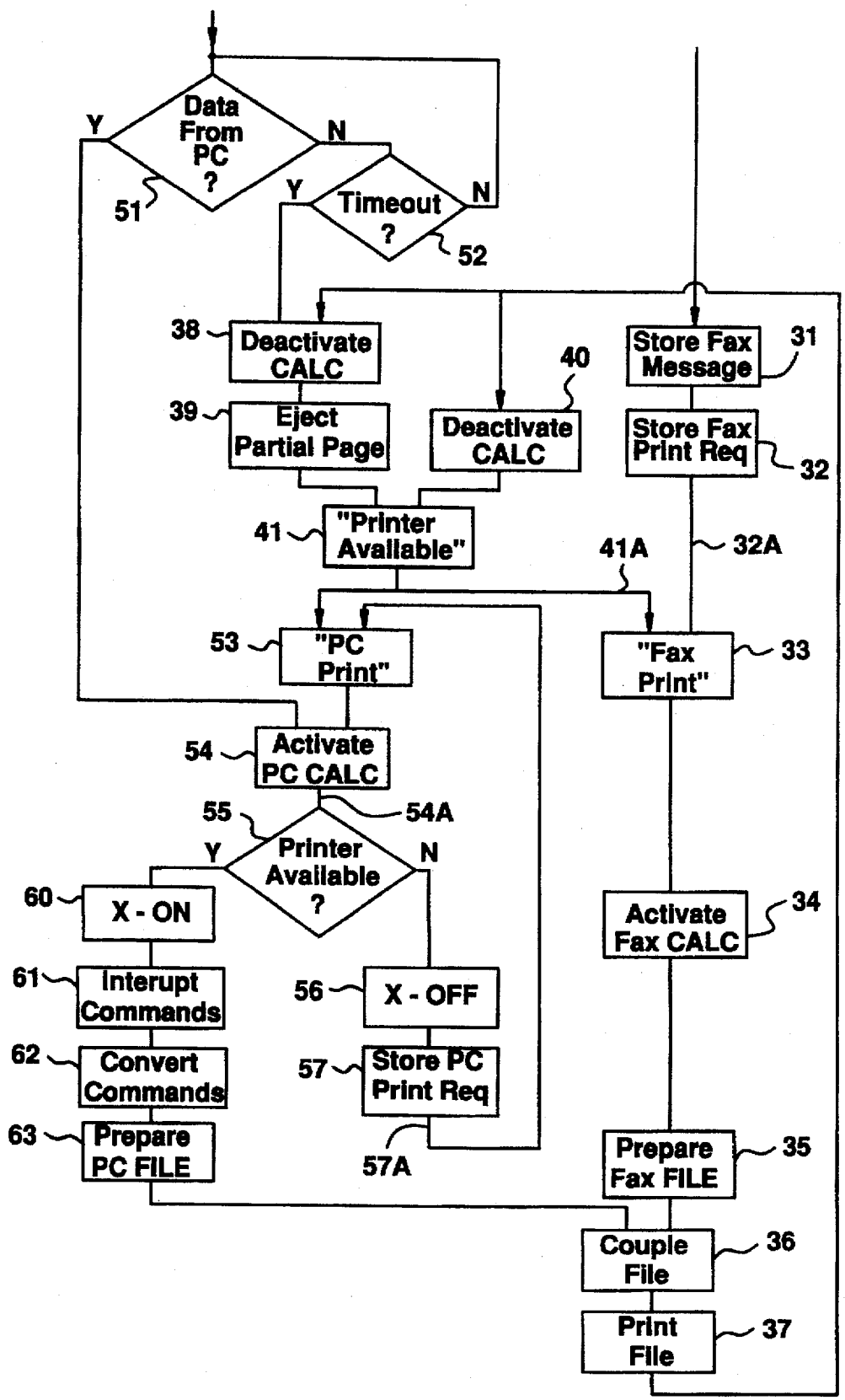

The invention will be better understood on basis of the following description of the preferred embodiment of the emulation device for the carrying out of the process of the invention, read with reference to the accompanying drawing, in which:

FIG. 1 is a block diagram of a facsimile machine comprising the emulation device of the invention, connected to a personal computer, FIG. 2 is a block diagram of the emulation device, and FIG. 3 is a flow diagram explaining the operation of the emulation device.

The facsimile machine 1 shown in FIG. 1 is connected by a bidirectional line 2, to a personal computer 3 and, by a line 4, to the switched telephone network.

The facsimile machine 1 comprises an emulation device 11 which is connected to the line 2, of RSC 232C type, as well as to a controller 12 and an input of a printing coupler 13 which controls a printer 14 of the facsimile machine 1. The controller 12 controls the coupler 13 and is connected to a device 15 for connecting the facsimile machine to the printer 14, comprising a calculation block 16 in which there is a memory 17 and a two-input AND gate 18. The connecting device 15 is connected to an interface circuit 19 which is connected to the line 4. The coupler 13 is connected to the input of the connecting device 15.

The emulation device 11 is shown in greater detail in FIG. 2.

The line 2 is connected to a buffer memory 21 which is connected at its output to a command interpretation circuit 22 the output of which is connected to a graphic generator circuit 24 via a command buffer circuit 23.

The graphic generator circuit 24 is connected at its output to the printing coupler 13, in its turn connected at its output to a calculation block 25 which controls the circuits 22 and 24 and exchanges data with the buffer memory 21. A memory 26 and a two-input AND gate 27 are provided in the calculation block 25.

The operation of the facsimile machine 1 with the emulation device 11 will now be explained with reference to the flow sheet of FIG. 3.

Let us assume that, the facsimile machine 1 being at rest, it receives a facsimile message containing data to be printed over the line 4 and the interface circuit 19.

The message is stored in the device 31 in step 31 and, in a step 32 following the start of this reception, a "facsimile" printing request 32A is stored in the connecting device 15. This request is applied to a combinational circuit, in this case the AND logic gate 18, receiving a signal 41A of availability of the printer 14, as explained further below.

In the event that the printer 14 is available, the AND gate 18, in step 33, supplies a "facsimile" printing command signal which, in step 34, causes the activating of circuits of the calculation block 16 which manage the carrying out of the printing. In a step 35, the calculation block 16 prepares a file containing the data to be printed in the form desired for the printing.

In a step 36, the calculation block 16 activates the printing coupler 13 via the controller 12 and transmits the above file to it. In step 37, the printer 14 prints the file, and the coupler 13 is then deactivated by the controller 12.

In a step 38, the calculation block 25 is deactivated, if this was the case as explained further below, and a final partially printed page is ejected at step 39 if this is the case.

After step 37, the calculation block 16 is deactivated in a step 40 and we pass to a step 41 in which the signal 41A of the availability of the printer 14, applied to the AND gate 18, is stored in the memory 17 and supplied. The step 39 is also followed by the step 41.

A sequence for the printing of data coming from the personal computer 3 will now be explained. This printing is managed by the emulation device 11.

In a step 51, the emulation device 11 tests the reception, in the buffer memory 21, of a character coming from the line 2. If the result of the test is positive (Y) then, in step 54, it activates the calculation block 25 and produces a "computer" printing request 54A.

This activation may also (OR function) be controlled by the AND gate 27 in a step 53. The AND gate 57 is connected to the memory 26 and receives from it on its first input a signal 57A of a stored "computer" printing request, as explained above, while at its second input it is connected to the memory 17 and receives the availability signal 41A from it.

After step 54, a cyclic scanning is effected in order in step 55 to check whether the printer 14 is available or whether it is being otherwise used or is absent. If it is not available (N), the calculation block 25 sends out, over the line 2, in step 56, through the buffer memory an order, in this case X-OFF, ordering the stopping of the sending of data by the personal computer 3 and, in a step 57, the "computer" printing request 54A is stored in the memory 26 in the form of the signal 57A. This stored "computer" printing request 57A is, as indicated, applied looping back to the AND gate 27. Steps 53–55 are repeated cyclically in order immediately to detect the availability of the printer 14 in the event that a computer printing request 57A has been stored.

The calculation block 25 also comprises a scanning loop 53–57 comprising the memory 26 which, via the signal 57A, stores the reception of the data from the computer 3.

In the case of positive response (Y) in step 55, we pass to a step 60 in which the interpretation circuit and graphic generator 24 are activated. A signal, X-ON, is also sent over the line 2 in order to invite the computer 3 to send its data to be printed, with the associated command data, defining the manner in which the said data are to be printed.

In a step 61, the commands are interpreted, here in accordance with the standard having the registered trademark "Proprinter", in the circuit 22 and, in a step 62, the command buffer circuit 23 produces, on the basis of the interpreted commands, a list of elementary commands, belonging to a set of commands limited here to four command. Each command comprises command fields or arguments, defining printing parameter such as "bold", "underscored", "superscript", and others, which increase the power of each command.

There are also conversion means 22, 23 for converting command data of the data from the computer 3 into data selected from the set or menu of predetermined commands. The commands converted in this manner can be carried out by the printer 14, which effects the desired emulation.

As they are supplied, the individual commands are carried out in a step 63, the data of the buffer memory 21 are processed, and the data to be printed are electronically formatted.

Steps 36 and 37 for the printing are then carried out.

A time delay is provided in the calculation block 25 in order to end the data-transmission session over the line 2 in case of the prolonged absence of the reception of characters. In case of non-receipt (N) of a character in step 57, it is checked, in step 52, whether a time delay device, returned to zero by any reception of a character coming from the line 2, has reached a predetermined threshold value. If not (N), one loops back to step 51. If the threshold is reached, one passes to step 38 of the deactivation of the calculation block 25.

It will thus be understood that in the event of a "facsimile" or "computer" printing request, this request is carried out immediately if the printer 14 is available (signal 41A). If not, then the signal 41A prevents the carrying out of either of the printings in the respective steps 33 and 53, 55, while, however, permitting the storing of the corresponding printing request 32A and 57A. This printing request brings about the cyclic scanning of the state of availability of the printer 14 by the AND gates in steps 33 and 53 and controls the activation (34, 54) of the associated calculation blocks 16, 25 as soon as the printer 14 again becomes available (41A).

Thus, in the process of the invention, the computer 3 is connected to the printer emulation device 11 of the facsimile machine which is activated by the reception of data from the computer 2 and, after activation of the emulation device 11 and generation of the printing request 57A, the emulation device 11 scans the printer 14 and determines its availability and, in the event that it is not available, the printing request 54A is stored in order to bring about a cyclic scanning of the printer 14 in order to commence the printing of the data from the computer 3 when the printer 14 becomes available.

It will be understood that the emulation device 11 could be external to the facsimile machine and, for instance, belong to the computer 3, the controller 12 being doubled, if necessary.

I claim:

1. A device for emulating a personal computer printer by printing data coming from a computer using a facsimile-machine printer, said emulation device comprising:

pc request means for generating a print request when said pc request means detects data coming from the computer; and control means for controlling the facsimile printer, said control means including scan means for cyclically scanning the facsimile printer so as to determine whether the facsimile printer is available, and priority means for causing the facsimile printer to print data coming from the computer when the facsimile printer is available after a print request is generated by said pc request means.

2. A device according to claim 1, in which the control means comprise conversion means (22, 23) for converting control data of the date from the computer 3 into data selected from a predetermined menu.

3. The device according to claim 1, said scan means includes:

storage means for storing the print request generated by said pc request means.

4. The device according to claim 3, wherein said priority means includes:

an AND gate connected so as to provide a signal when said storage means contains a print request and said scanning loop detects that the printer is available, said AND gate having a first input connected to said storage means and a second input connected to said scanning means, said signal causing said facsimile printer to print data coming from the computer.

5. A method for emulating a personal computer printer by printing data coming from a computer using a facsimile-machine printer having an emulation device, said emulation device being connected so as to be activated by data coming from said computer, said method comprising the steps of:

1) generating a pc printing request after activating said emulation device;

2) scanning the facsimile printer to determine whether the facsimile printer is available;

3) storing said pc printing request when the facsimile printer is not available and repeating step 2 until the facsimile printer is available; and 4) printing data from the computer in response to said pc printing request when the facsimile printer is available.

* * * * *